US010131372B2

(12) United States Patent
Bod (10) Patent No.: US 10,131,372 B2
(45) Date of Patent: Nov. 20, 2018

(54) NESTABLE TRANSPORT DEVICE

(71) Applicant: BERGH SPECIAL PRODUCTS BV, 's-Heerenberg (NL)

(72) Inventor: Frank Bod, 's-Heerenberg (NL)

(73) Assignee: BERGH SPECIAL PRODUCTS B.V., 'S-Heerenberg (NL)

( * ) Notice: Subject to any disclaimer, the term of this patent is extended or adjusted under 35 U.S.C. 154(b) by 0 days.

(21) Appl. No.: 15/568,695

(22) PCT Filed: Apr. 20, 2016

(86) PCT No.: PCT/NL2016/050279
§ 371 (c)(1),
(2) Date: Oct. 23, 2017

(87) PCT Pub. No.: WO2016/171554
PCT Pub. Date: Oct. 27, 2016

(65) Prior Publication Data
US 2018/0154917 A1    Jun. 7, 2018

(30) Foreign Application Priority Data
Apr. 24, 2015   (NL) ..................................... 2014714

(51) Int. Cl.
*B62B 3/14* (2006.01)
*A61G 5/00* (2006.01)
(Continued)

(52) U.S. Cl.
CPC .............. *B62B 3/1404* (2013.01); *A61G 5/00* (2013.01); *A61G 5/10* (2013.01); *B62B 3/02* (2013.01);
(Continued)

(58) Field of Classification Search
CPC ........ A61G 5/00; A61G 5/10; A61G 2203/76; B62B 3/14; B62B 3/1404; B62B 3/146;
(Continued)

(56) References Cited

U.S. PATENT DOCUMENTS 3,015,494 A     1/1962  Fosbrook
5,417,300 A  *  5/1995  Shultz ..................... B60R 19/38
                                                                180/208
(Continued)

FOREIGN PATENT DOCUMENTS

DE      10039716 A1    2/2002
EP         430058 A1    6/1991
GB       2176444 A    12/1986

*Primary Examiner* — John D Walters
*Assistant Examiner* — James J Triggs
(74) *Attorney, Agent, or Firm* — Taft Stettinius & Hollister LLP; Derek B. Lavender (57) ABSTRACT

The invention relates to a transport means (1) provided with a base frame, comprising a plurality of wheels (5, 6), two legs (3) and a transverse connecting element (4) which connects the legs (3), wherein the legs (3) extend adjacently of each other and taper as seen from a rear side to a front side of the base frame, wherein each of the legs (3) is provided on the rear side with at least one rear wheel (5) and wherein at least one front wheel (6) is mounted on the front side of the base frame, wherein the transport means (1) is provided with coupling means for pairwise coupling of two transport means in a nested position, wherein the coupling means comprise first and second coupling means, wherein the first coupling means are arranged on the inner side of at least one of the legs (3) and wherein the second coupling means are arranged on the outer side of at least one of the legs (3), and wherein the first coupling means of a first transport means (1) are configured to co-act with the second coupling means of a second transport means (1) for the purpose of releasably (Continued)

locking the second transport means (1) in the first transport means (1) in the nested position.

10 Claims, 6 Drawing Sheets

(51) Int. Cl.
 *A61G 5/10* (2006.01)
 *B62B 3/02* (2006.01)
(52) U.S. Cl.
 CPC ...... *A61G 2203/76* (2013.01); *B62B 2207/02* (2013.01)
(58) Field of Classification Search
 CPC ... B62B 2207/00; B62B 2207/02; B62B 7/00; B62B 11/00
 See application file for complete search history.

(56) References Cited

U.S. PATENT DOCUMENTS

| | | | |
|---|---|---|---|
| 6,142,566 A * | 11/2000 | Ritch | A47C 3/04 297/239 |
| 6,315,306 B1 * | 11/2001 | Fernie | A61G 5/00 280/33.991 |
| 6,412,795 B1 | 7/2002 | Staxi | |
| 9,730,846 B2 * | 8/2017 | Kutsch | A61G 5/08 |
| 2003/0090073 A1 * | 5/2003 | Whang | A61G 5/00 280/33.991 |
| 2007/0063460 A1 | 3/2007 | O'Quin | |
| 2018/0154917 A1 * | 6/2018 | Bod | A61G 5/00 |

* cited by examiner

NESTABLE TRANSPORT DEVICE

INCORPORATION BY REFERENCE

This application is a U.S. National Phase of International PCT Application No. PCT/NL2016/050279 filed on Apr. 20, 2016, which claims priority to NL Application No. 2014714 filed on Apr. 24, 2015, the contents of each application are herein incorporated by reference in their entirety.

The invention relates to a transport means provided with a base frame, comprising a plurality of wheels, two legs and a transverse connecting element which connects the legs, wherein the legs extend adjacently of each other and taper as seen from a rear side to a front side of the base frame, wherein each of the legs is provided on the rear side with at least one rear wheel and wherein at least one front wheel is mounted on the front side of the base frame, wherein the transport means is provided with coupling means for pairwise coupling of two transport means in a nested position.

Such a transport means is known from U.S. Pat. No. 6,860,493. A nestable cart is described herein. The known cart is provided with a platform which tapers in the coupling direction and is provided on the rear side with roller means, for instance wheels, which serve as coupling means. Each platform is provided with a downward directed open side which extends from the rear side to the front side of the platform, wherein the open side is open on the rear side of the platform. Two identical transport means can be nested by positioning the front side of the platform of a second transport means under the platform of a first transport means using the roller means. The known transport means can be easily placed in a nested position in reliable manner. The rear side of the front transport means is lifted off the ground in nested position, so that a row of transport means can be easily maneuvered.

The present invention has for its object to provide a nestable transport means according to the preamble with improved coupling means which enable the nesting of two of such identical transport means.

The transport means according to the invention has for this purpose the feature that the coupling means comprise first and second coupling means, wherein the first coupling means are arranged on the inner side of at least one of the legs and wherein the second coupling means are arranged on the outer side of at least one of the legs, and wherein the first coupling means of a first transport means are configured to co-act with the second coupling means of a second transport means for the purpose of releasably locking the second transport means in the first transport means in the nested position.

The first and second coupling means for the base frame of the transport means according to the invention can be applied universally to any transport means with a base frame which is open on the rear side. Non-limitative examples of such base frames, as described in the preamble of claim 1, are a U-shaped or H-shaped base frame. The presence of a platform is not essential. The improved coupling means co-act pairwise and are releasably lockable. Owing to the positioning on the legs of the base frame, the coupling means are moreover positioned inconspicuously.

In a preferred embodiment the first coupling means of the first transport means and the second coupling means of the second transport means are configured to lift the rear wheels of the first transport means off the ground in the nested position. A group of nested transport means is thereby controllable by manual or automatic driving of the rear transport means. The front wheels are preferably swivel wheels in order to facilitate the maneuvering.

In a first preferred embodiment the first coupling means are configured to lock the forward movement of the second transport means in the first transport means in the nested position. During maneuvering with a group of nested transport means the coupling will remain locked, even if speed is suddenly decreased.

According to an alternative preferred embodiment, the second coupling means are arranged displaceably on the outer side of at least one of the legs. The nesting depth can be set to a desired dimension by adjusting the position of the second coupling means.

In a practical preferred embodiment the second coupling means comprise a protrusion and the first coupling means comprise a locking element provided with a recess for receiving the protrusion. The locking element preferably takes a hook-like form. The protrusion and the (resilient) hook form a reliable releasable locking which can be manufactured with relatively small dimensions. The hook is highly suitable for realizing the intended forward locking, wherein an optimum can be found between forward locking and manual uncoupling.

In a further elaboration of the preferred embodiment of the transport means according to the invention the protrusion is height-adjustable while it is received in the locking element and the transport means is provided with operating means for adjusting the height of the protrusion. This measure makes it possible to lift the rear wheels of the front transport means by means of the operating means in the case that the front transport means is heavy, for instance due to a person who has taken up position in the front transport means. The coupling of the front transport means to the rear transport means proceeds as follows:

the rear transport means is first nested with the front transport means, wherein the protrusion is positioned under the locking element;

the protrusion is then displaced in height using the operating means, wherein the protrusion is received in the locking element and the protrusion then lifts the locking element and thereby the rear wheels or rear feet of the front transport means.

In a practical elaboration of the further preferred embodiment the protrusion is arranged eccentrically on a shaft, which shaft is rotatably mounted on the outer side of one of the legs, and the transport means is provided with operating means for rotating the shaft between a first position, in which the protrusion is situated substantially below the shaft, and a second position in which the protrusion is situated substantially above the shaft. A displacement of the protrusion in height is possible in inventive yet effective manner due to this eccentric placing of the protrusion on the shaft.

The operating means here preferably comprise a lever and the shaft is provided with a crank, wherein the lever is connected to the crank. The lever makes it possible to operate the crank, by means of a large movement with a small force, with a relatively smaller movement and a greater force.

In a particular preferred embodiment the transport means according to the invention is a wheelchair.

The invention will now be described in more detail with reference to the figures.

Figure 1:
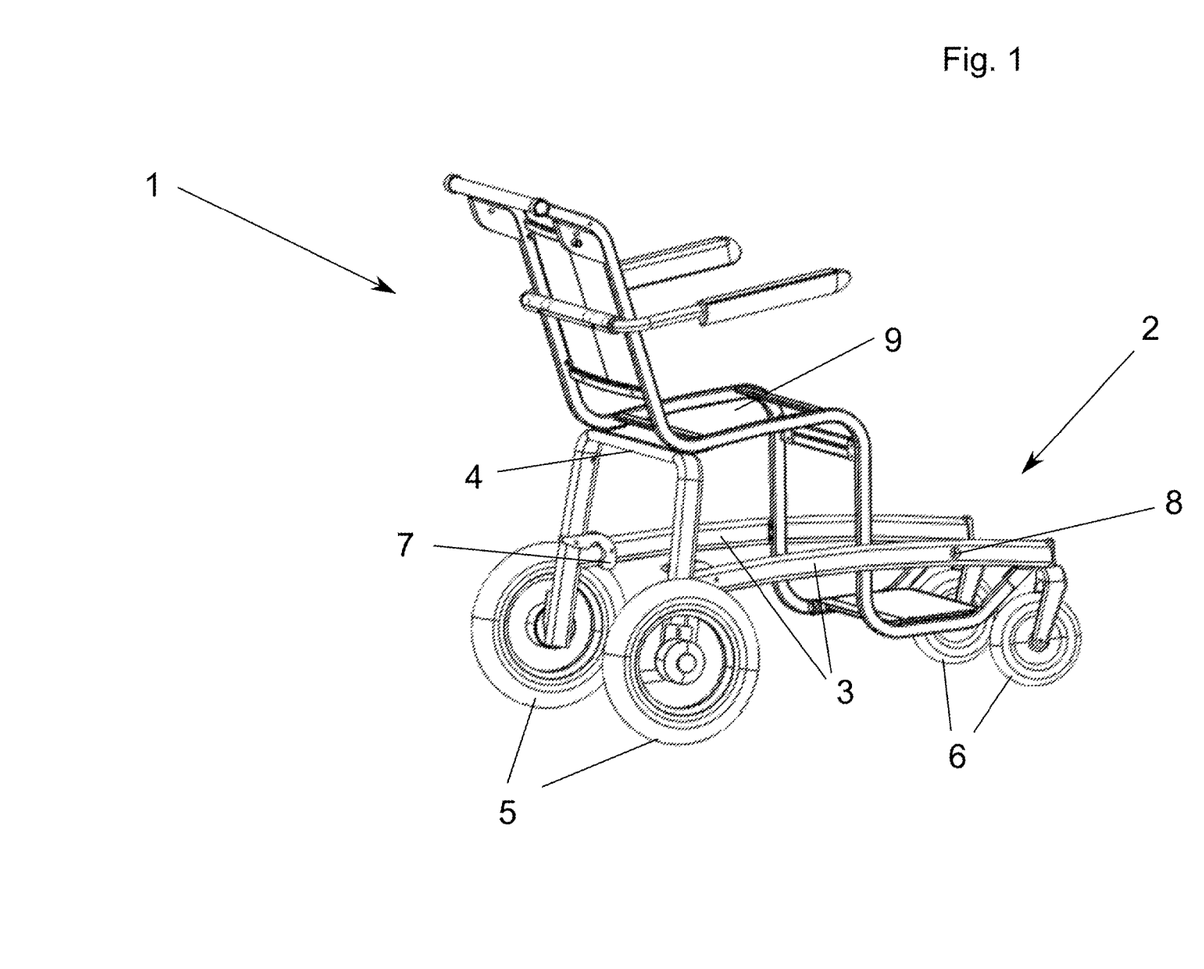
FIG. 1 shows a schematic view of a preferred embodiment of the transport means according to the invention.

FIG. 1 shows a schematic view of a preferred embodiment of the transport means according to the invention. In the shown preferred embodiment the transport means is a wheelchair 1. Wheelchair 1 is provided with a mobile base frame 2 which has a plurality of wheels 5,6, two legs 3 and a transverse connecting element 4. Legs 3 extend substantially adjacently of each other and taper as seen from a rear side to a front side of base frame 2. Transverse connecting element 4 mutually connects the legs. In the shown preferred embodiment the transverse connecting element is generally U-shaped and serves to support a seat 9. Seat 9 itself functions as further transverse connecting element and connects legs 3 to the front side.

Mounted on the rear side of each of the legs 3 is a rear wheel 5. Mounted on the front side of each of the legs 3 is a front wheel 6. Front wheels 6 are embodied as swivel wheels. The number of wheels of transport means 1 can vary but amounts to a minimum of three, one wheel of which can be embodied as front wheel.

Transport means 1 is provided with coupling means 7,8 for pairwise coupling and releasable locking of two transport means 1 in nested position. According to the invention, the coupling means comprise co-acting first coupling means 7 and second coupling means 8 and the first coupling means 7 are arranged close to rear wheels 5 on the base frame and the second coupling means 8 are arranged on the outer side of legs 3. In the shown preferred embodiment the first coupling means 7 are arranged on the inner side of legs 3.

Figure 2A:
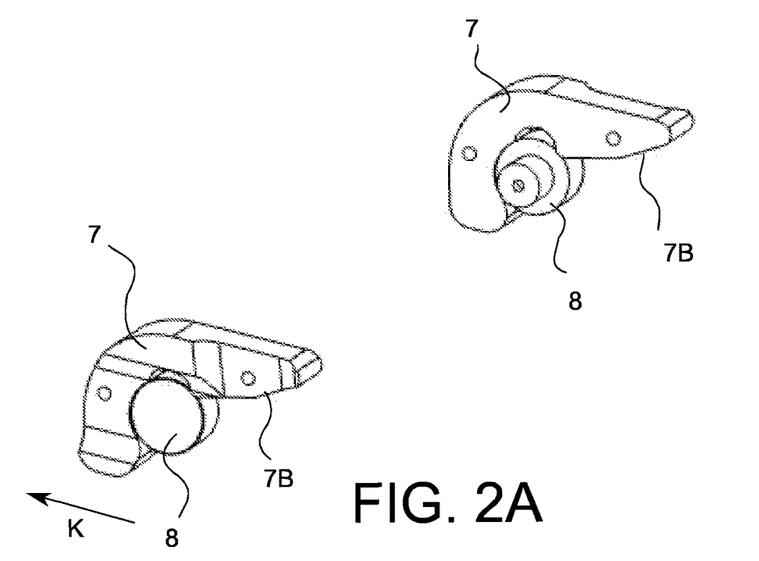
FIGS. 2A and 2B show the coupling means of the transport means of FIG. 1 in more detail in respectively coupled and uncoupled position.
Figure 2B:
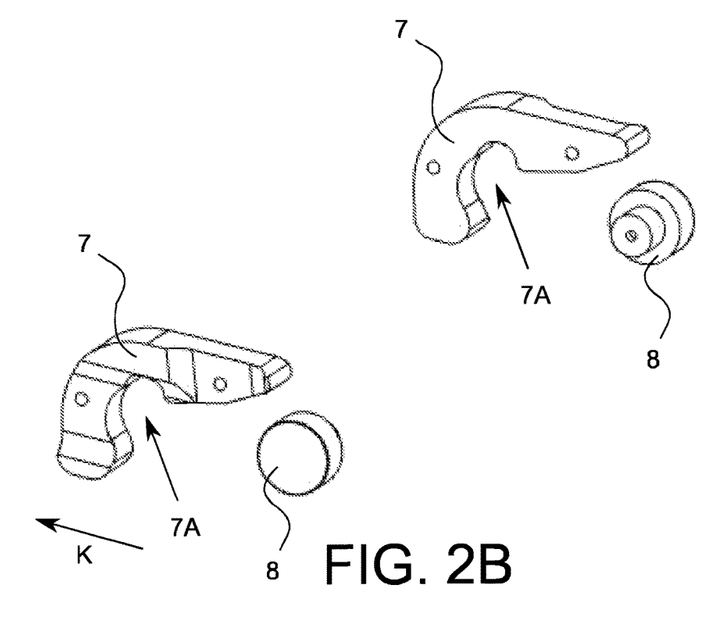

FIGS. 2A and 2B show coupling means 7,8 of transport means 1 in more detail in respectively coupled and uncoupled position. A pair of coupling means 7,8 is shown in coupled position and a pair of coupling means 7,8 is shown in uncoupled position. First coupling means 7 comprise a locking element which is provided with a recess 7A. The second coupling means are embodied as protrusion 8 and intended to be received in recess 7A. Locking element 7 takes a generally hook-like form. Hook 7 is provided with a sloping contact surface 7B for co-action with protrusion 8. Sloping contact surface 7B slopes downward as seen in coupling direction K. The first and second coupling means 7,8 can be manufactured from various suitable types of material. The preferred material for the first coupling means is plastic. The preferred material for the second coupling means is metal.

Figure 3:
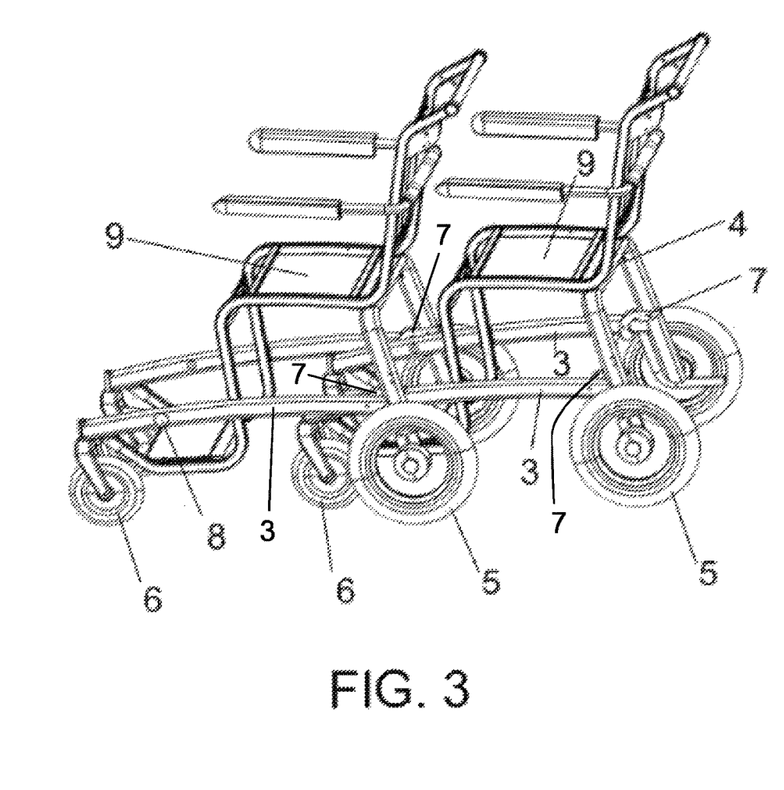
FIG. 3 shows two transport means according to FIG. 1 in nested position.

Because of the tapering legs 3 the base frames 2 of wheelchairs 1 can take up a nested position. FIG. 3 shows two transport means 1 in the nested position. In the shown preferred embodiment the height of protrusion 8 on leg 3 is chosen relative to the height of locking element 7, and more particularly of recess 7A, on leg 3 such that the rear wheels 5 of a front transport means 1 are lifted off the ground in coupled position of the first coupling means 7 of first transport means 1 and the second coupling means 8 of second transport means 1.

In an alternative preferred embodiment the second coupling means, for instance protrusion 8, are arranged displaceably on the outer side of legs 3. Protrusion 8 can for instance be arranged on a pivotable element which is displaceable between two positions on leg 3. According to another variant, protrusion 8 is arranged slidably on leg 3. The distance of protrusion 8 to the front side of legs 3 determines the depth over which a transport means 1 can be nested in a transport means 1 in front thereof. The maximum nesting depth is limited. In the preferred embodiment with seat 9 this maximum nesting depth is determined by the position of seat 9 on base frame 2. By maintaining sufficient distance between the position of protrusions 8 on legs 3 and the position of seat 9 on base frame 2, wheelchairs 1 can if desired be coupled with passenger. A row of two or more coupled wheelchairs 1 can in this way be formed. This row can be pushed by a person or by an auxiliary vehicle. This auxiliary vehicle can be a per se known pusher cart. The final wheelchair in the train can alternatively be an electrically driven wheelchair which can drive the coupled wheelchair(s) in front. The co-acting forms of hook 7 and protrusion 8 guarantee a sufficiently strong coupling which is also maintained with load, for instance in the case of wheelchairs loaded with passengers, even if the row has to slow down suddenly.

Figure 4:
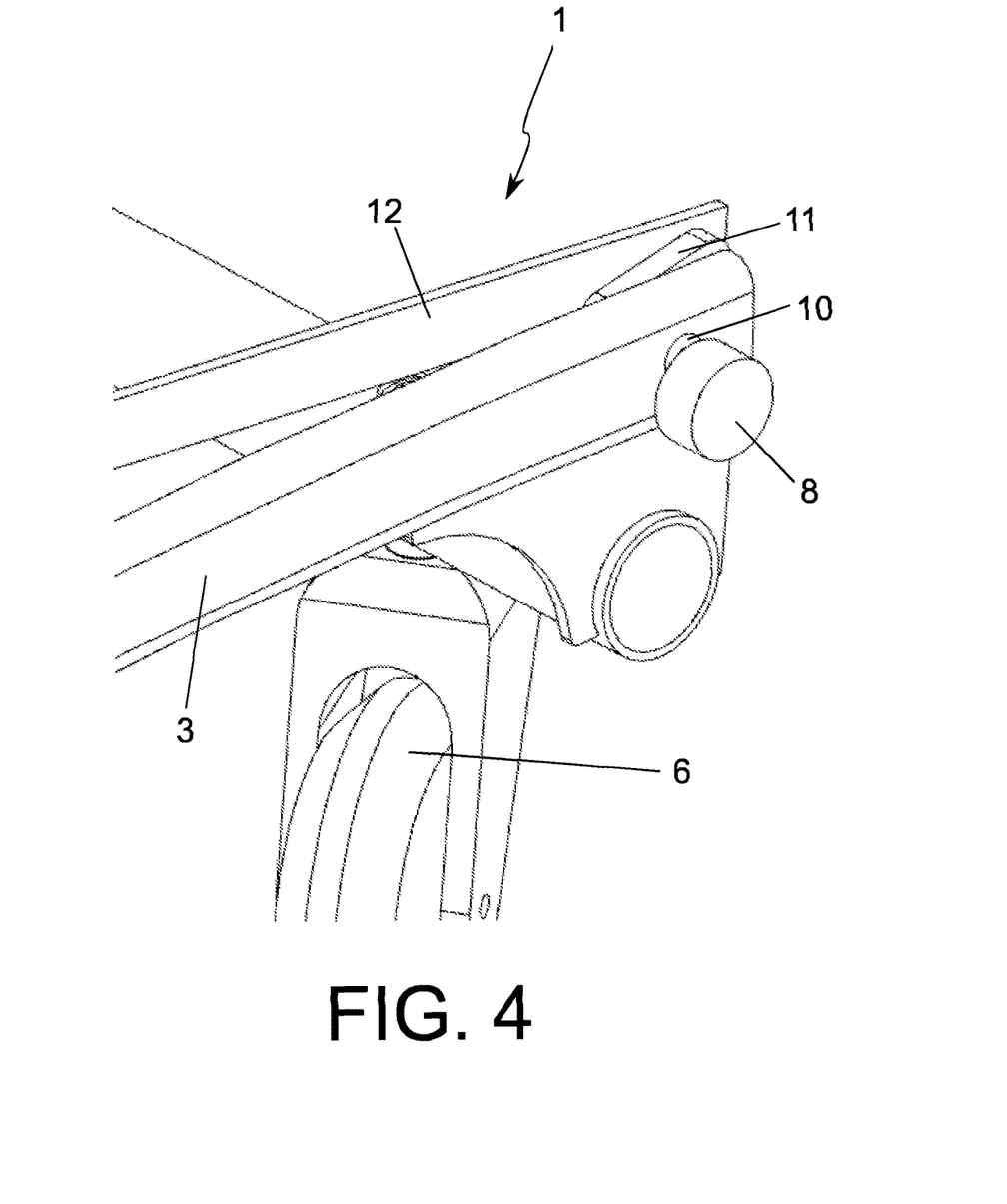
FIG. 4 shows a detail of a further embodiment of the transport means, wherein the protrusion is height-adjustable.

FIG. 4 shows a detail of a further embodiment of transport means 1, wherein protrusion 8 is displaceable in height. Protrusion 8 is arranged for this purpose eccentrically on a shaft 10. Shaft 10 is rotatably mounted on the outer side of one of the legs 3. Transport means 1 is provided with operating means for rotating shaft 10 between a first position and a second position. In the first position protrusion 8 is situated substantially below shaft 10. In the second position protrusion 8 is situated substantially above shaft 10. Shaft 10 is provided with a crank 11 which is connected to a lever mechanism 11,12. Crank 11 can optionally also be operable with an electrical drive. The coupling of the front to the rear transport means 1 takes place by placing protrusion 8 in the first position, after which protrusion 8 and the locking element are brought together. Protrusion 8 is then moved into the second position with the operating mechanism, after which the front transport means 1 is placed at height by protrusion 8, whereby the rear wheels of front transport means 1 are lifted. This further embodiment of the invention is particularly suitable in the case that the front transport means 1 is heavy, for instance if a person is present in front transport means 1. In this embodiment this person can remain seated in front transport means 1 during the coupling to rear transport means 1.

Figure 5:
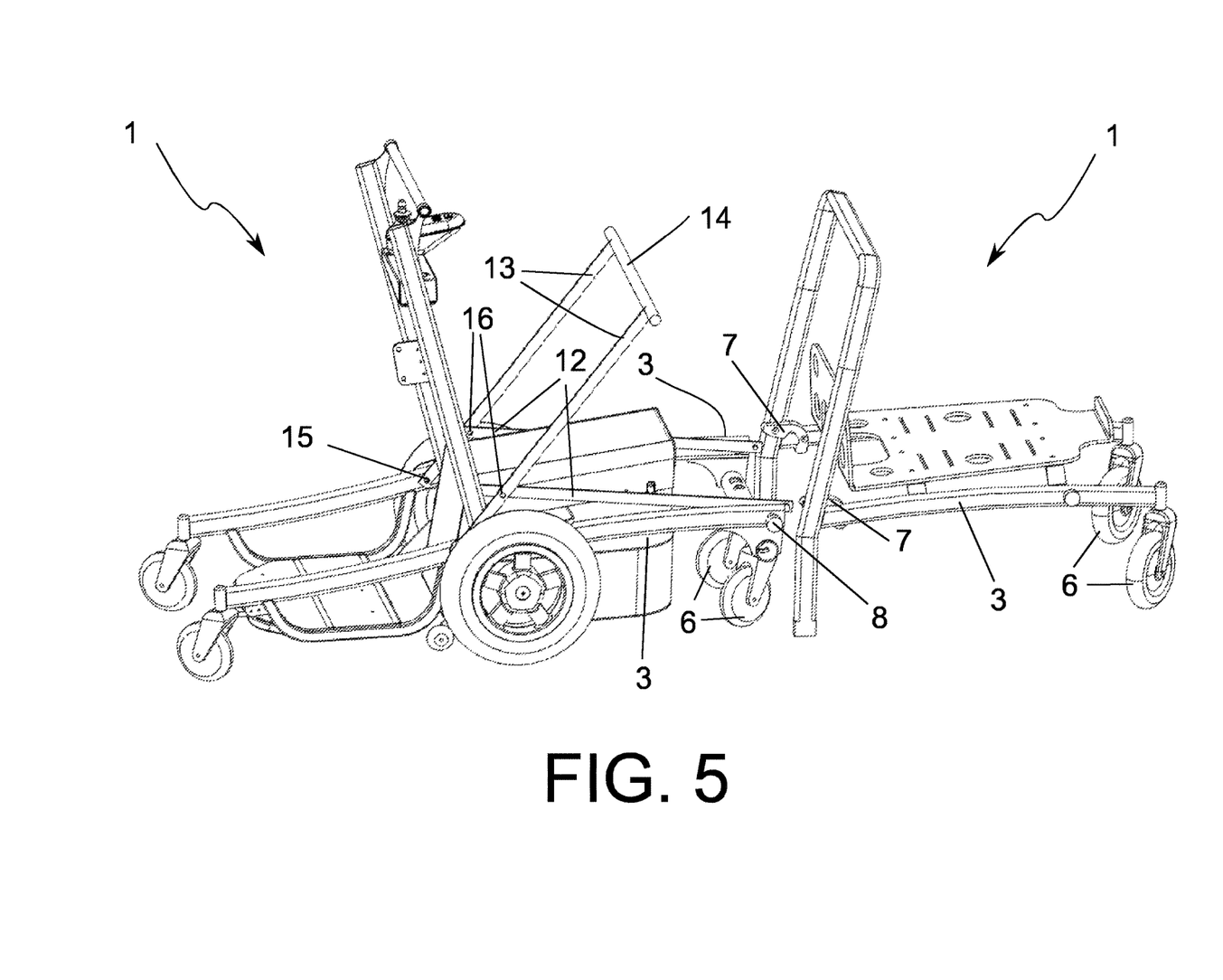
FIG. 5 shows a front and rear transport means according to the invention, wherein the rear transport means is provided with operating means comprising a lever for displacing the protrusion, wherein the protrusion has been placed in the first position.

FIG. 5 shows a front and rear transport means 1 according to the invention, wherein rear transport means 1 is provided with operating means comprising a lever for displacing protrusion 8, wherein protrusion 8 has been placed in the first position. The operating means comprise a lever 12;13 which is connected to crank 11 of shaft 10. Lever 12;13 can be operated by means of an operating rod 14. By means of lever 12;13 a displacement of operating rod 14 with little force will result in a smaller displacement of shaft 10 with great force, whereby shaft 10 can be rotated. Legs 13 of the lever are for this purpose rotatably connected at a first outer end to the transport means at a pivot point 15 and legs 12;13 are pivotally connected to each other, above pivot point 15, at pivot point 16.

Figure 6:
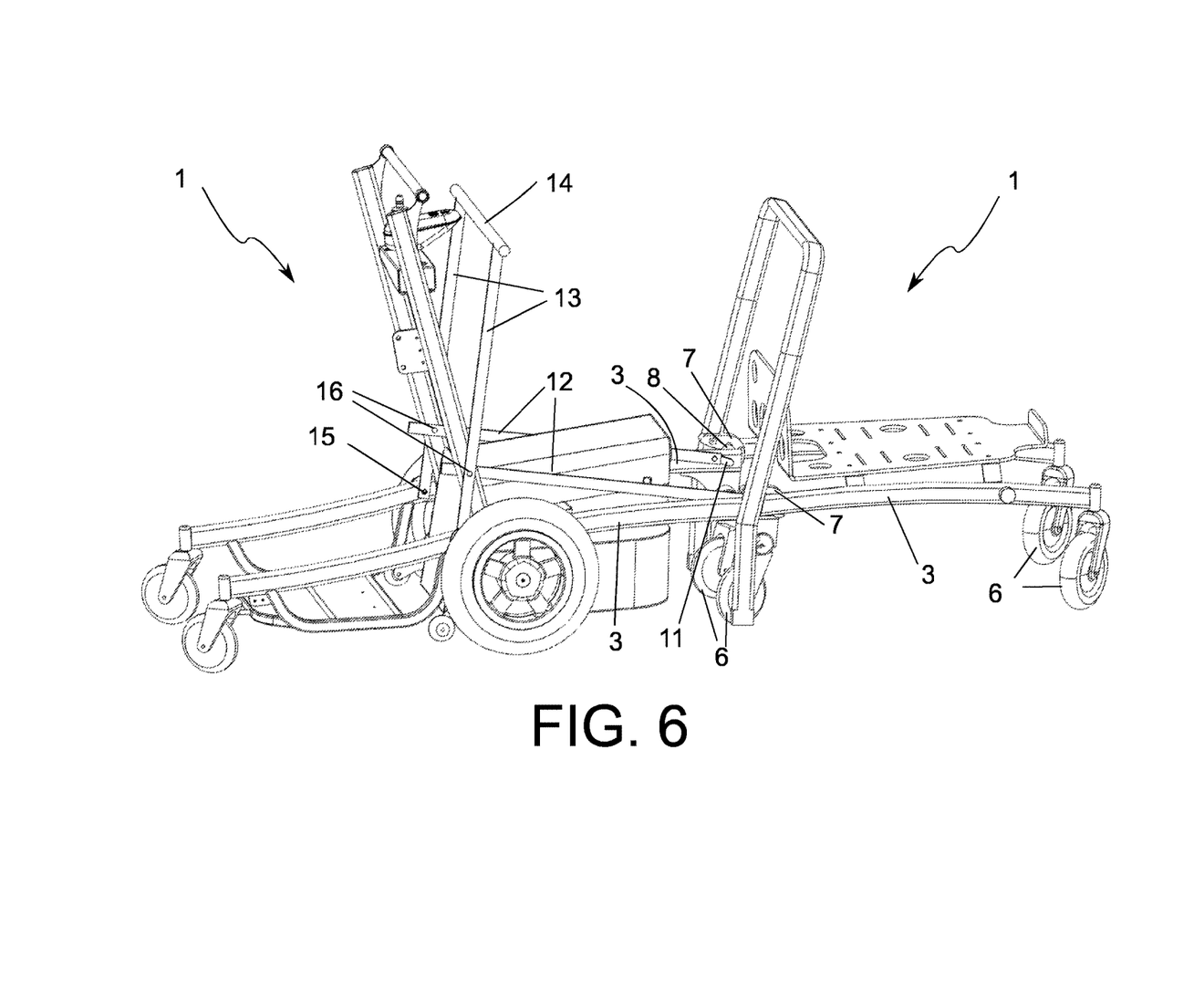
FIG. 6 shows the front and rear transport means according to FIG. 5, wherein the protrusion has been placed in the second position.

FIG. 6 shows the front and rear transport means 1 according to FIG. 5, wherein protrusion 8 has been placed in the second position. Operating rod 14 has been displaced in the direction of the rear side of rear transport means 1, whereby protrusion 8 is in engagement with locking element 7. The rear wheels or feet of front transport means 1 are now lifted off the ground.

The inventive concept is based on the insight of embodying the coupling means as locking means and arranging them on the inner side and partially on the outer side of a nestable frame of a transport means. The present invention is expressly not limited here to the described and shown preferred embodiment. The invention is for instance not limited to the application in a wheelchair, as described and shown in the accompanying figures, but extends to other applications, such as for instance shopping trolleys, luggage trolleys, rollators and so on. In the shown embodiment the first coupling means and the second coupling means take a dual form and are arranged on both legs. The first coupling means and the second coupling means can alternatively take a single form and be arranged on only one of the two legs. This can be both the right and the left leg.

The invention therefore extends to any embodiment falling within the scope of protection as defined in the claims and as seen in the light of the foregoing description and accompanying drawings.

The invention claimed is:

1. Transport means provided with a base frame, comprising a plurality of wheels, two legs and a transverse connecting element which connects the legs, wherein the legs extend adjacently of each other and taper as seen from a rear side to a front side of the base frame, wherein each of the legs is provided on the rear side with at least one rear wheel and wherein at least one front wheel is mounted on the front side of the base frame, wherein the transport means is provided with coupling means for pairwise coupling of two transport means in a nested position, wherein the coupling means comprise first and second coupling means, wherein the first coupling means are arranged on the inner side of at least one of the legs and wherein the second coupling means are arranged on the outer side of at least one of the legs, and wherein the first coupling means of a first transport means are configured to co-act with the second coupling means of a second transport means for the purpose of releasably locking the second transport means in the first transport means in the nested position.

2. Transport means as claimed in claim 1, wherein the first coupling means of the first transport means and the second coupling means of the second transport means are configured to lift the rear wheels of the first transport means off the ground in the nested position.

3. Transport means as claimed in claim 1, wherein the first coupling means are configured to lock the forward movement of the second transport means in the first transport means the nested position.

4. Transport means as claimed in claim 1, wherein the second coupling means are arranged displaceably on the outer side of at least one of the legs.

5. Transport means as claimed in claim 1, wherein the second coupling means comprise a protrusion and wherein the first coupling means comprise a locking element provided with a recess for receiving the protrusion.

6. Transport means as claimed in claim 5, wherein the locking element takes a hook-like form.

7. Transport means as claimed in claim 1, wherein the transport means is a wheelchair.

8. Transport means as claimed in claim 5, wherein the protrusion is height-adjustable while it is received in the locking element and wherein the transport means is provided with operating means for adjusting the height of the protrusion.

9. Transport means as claimed in claim 8, wherein the protrusion (8) is arranged eccentrically on a shaft, which shaft is rotatably mounted on the outer side of one of the legs, and wherein the operating means are configured to rotate the shaft between a first position, in which the protrusion is situated substantially below the shaft, and a second position in which the protrusion is situated substantially above the shaft.

10. Transport means as claimed in claim 9, wherein the operating means comprise a lever and the shaft is provided with a crank, wherein the lever is connected to the crank.

\* \* \* \* \*